United States Patent
Yu et al.

(10) Patent No.: US 7,774,373 B2
(45) Date of Patent: Aug. 10, 2010

(54) METHOD AND SYSTEM FOR IMPLEMENTING MULTIPLE WEB SERVICES FOR A SERVICE QUERY

(75) Inventors: Qi Yu, Blacksburg, VA (US); Yao Meng, San Jose, CA (US); Fuliang Weng, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 365 days.

(21) Appl. No.: 12/072,707

(22) Filed: Feb. 26, 2008

(65) Prior Publication Data

US 2009/0216711 A1   Aug. 27, 2009

(51) Int. Cl.
   G06F 17/30   (2006.01)
(52) U.S. Cl. .................................. 707/798; 707/718
(58) Field of Classification Search .................. 707/1, 707/2, 10, 100–104.1, 718, 736, 737, 797, 707/798
   See application file for complete search history.

(56) References Cited

OTHER PUBLICATIONS

E. W. Dijkstra: *A note on two problems in connexion with graphs.* In: Numerische Mathematik. 1 (1959), S. 269-271.
HP, *Web Service Management Framework (WSMF)*, http://devresource.hp.com/drc/specifications/wsmf, 2003.
WS-Management, http://xml.coverpages.org/WS-Management200506.pdf, 2005.
Oasis, *Web Services Distributed Management (WSDM)*, http://www.oasis-open.org/committees/tc_home.php?wg_abbrev=wsdm, 2006.
Jurca R. et al. Reliable QoS monitoring Based on Client Feedback, WWW 2007/Track: Web Services, Session: SLAs and QoS.
European Search Report, Application No. EP 09152630.1, dated Apr. 15, 2009.
Yu, Q. et al., "Framework for Web Service Query Algebra and Optimization," ACM Transactions on the Web Association for Computing Machinery US, vol. 2, No. 1, Feb. 1, 2008, pp. 6.1-6.35.
Esfandiari, B., et al., "Towards a Web Service Composition Management Framework," Web Services, ICWS 2005, Proceedings, Jul. 11, 2005 IEEE International Conference pp. 419-426.
Yu, Q., et al., "Deploying and Managing Web Services: Issues, Solutions, and Directions," The VLDB Journal: The International Journal on Very Large Data Bases, vol. 17, No. 3, Nov. 4, 2006, pp. 537-572.
Lamparter, S., et al., "Preference-Based Selection of Highly Configurable Web Services," 16th International World Wide Web Conference, 2007, pp. 1013-1022.

*Primary Examiner*—Cam-Linh Nguyen
(74) *Attorney, Agent, or Firm*—Kenyon & Kenyon LLP

(57) ABSTRACT

In a system and method for fulfilling a service query for a user, a processor may parse the query into a set of operations, identify a set of service providers that each provides functionality for performing at least one respective operation of the set of operations, and, for each of the set of operations, select a respective one of the set of service providers to perform the operation, and interface with the service provider selected for the operation to cause the service provider to perform the operation.

18 Claims, 9 Drawing Sheets

METHOD AND SYSTEM FOR IMPLEMENTING MULTIPLE WEB SERVICES FOR A SERVICE QUERY

COPYRIGHT NOTICE

A portion of the disclosure of this patent document contains material that is subject to copyright protection. The copyright owner has no objection to the facsimile reproduction by anyone of the patent document or patent disclosure as it appears in the Patent and Trademark Office, patent file or records, but otherwise reserves all copyright rights whatsoever.

FIELD OF THE INVENTION

The present invention relates to a system and method for selecting and implementing a string of web services in response to a service query.

BACKGROUND INFORMATION

Web users may access and invoke various web services offered by various web service providers to obtain one or more results. A combination of web services, each outputting a respective result, may be used to obtain a single sought after result or set of results. For example, a web user may desire to obtain a list of restaurants of a certain type, e.g., seafood, that are on a route that extends from the web user's current location to another specified destination location. To do so, the web user might perform a keyword search for seafood restaurants in city x, select the links to the returned restaurant listings to obtain an address, provide each address to a web service for obtaining a corresponding geographic code, instantiate a direction providing service for obtaining a route from the web user's current location to the destination location, and enter the route and the geographic codes into a comparison web service for finding the points along the route to which the geographic codes are respectively determined to be closest and for returning only those of the codes that are within a threshold distance of the route. Separately interfacing with the various web services is tedious.

Traditional resource management systems use a variety of incompatible and proprietary interfaces and protocols. These demand intensive manual work (e.g., programming) when new resources are available. Hewlett-Packard (HP) provides a Web Service Management Framework (WSMF) that is a logical architecture for managing distributed computing resources and that has been proposed to address this issue by leveraging the extensibility and loose coupling offered by the web service technology. It defines a standard and platform-independent protocol for extraction of management information. The protocol is extensible for supporting more complex IT management issues as new standards appear for security, routing, discovery, etc.

Three key concepts of the WSMF are managed objects, event notification, and relationships. A managed object provides management capabilities via management interfaces. Resources are modeled as managed objects that have certain relationships between each other. The managed objects provide a set of management interfaces via which the underlying resources can be managed. The managed objects are web services because the management interfaces are described using the Web Service Definition Language (WSDL) and managing a resource can be achieved by accessing a web service. This enables managers to manage resources of a domain in a uniform manner.

The WSMF includes an event subsystem, which defines operations to subscribe for event notifications and specifies the notification syntax and processing rules to inform subscribers once an event occurs. An event may represent a state change in a managed resource. It may also represent the processing of a request by the managed resource that can be communicated via a notification.

Relationships defines the behavior and the dependencies between managed objects. They essentially reflect the relationships between the underlying resources. A relationship describes the association type between two managed objects.

The Organization for the Advancement of Structured Information Standards (OASIS) provides Web Services Distributed Management (WSDM), which specifies how the manageability of a resource is made available to manageability consumers via web services. WSDM leverages the integration capacity of web services for resource management purpose. Web service technologies are used to integrate management applications that are used to manage heterogeneous IT resources. This helps setup a management infrastructure that is vendor-neural, platform independent, and allows using a common messaging protocol between a manageable resource and a manageability consumer.

Three key components in the WSDM architecture are the manageable resource, endpoint reference, and manageability consumer. The manageable resource may be represented as a web service and accessible via a web service endpoint. The endpoint is referenced by an endpoint reference, which is defined in the WS-Addressing specification. The reference point provides the target location to which a manageability consumer can direct messages.

The WSDM supports three modes of interactions among the three components. A manageability consumer may retrieve management information from the manageable resource. A manageability consumer may affect the state of the manageable resource by changing its management information. A manageable resource may notify a manageability consumer about a significant event. The WSDM also offers a set of facilities to support the above interactions, including a resource property document, manageability capabilities, management events, message exchange patterns, and advertisement.

Microsoft (MS) also presents a Web Services Management specification, called WS-Management, with a similar purpose as the WSMF and WSDM of HP and OASIS, respectively. A common objective of the Web Service Management Systems from all these industrial players is to address the cost and complexity of IT management by using web service technology. They offer a resource management solution at the enterprise level. The user group of these management systems would be entrepreneurs or resource managers.

SUMMARY OF THE INVENTION

Methods and embodiments of the present invention provide a Web Service Management Module (WSMM) system that may be used by the common web users to access multiple web services in an easy and optimal manner. The WSMM may be a suitable technological choice, e.g., for the automotive industry whose customers (e.g., drivers and passengers) are commonly web users who access web services, e.g., for obtaining navigation instructions, traffic reports, etc.

The WSMM may provide functionalities for managing web services. The functionalities may include one or more of service querying, query optimization, quality management, and user profile management.

A method for fulfilling a service query for a user according to an example embodiment of the present invention may include: parsing the query into a set of operations; identifying a set of service providers that each provides functionality for performing at least one respective operation of the set of operations; and, for each of the set of operations, selecting a respective one of the set of service providers to perform the operation and interfacing with the service provider selected for the operation to cause the service provider to perform the operation.

The identification of the set of service providers may include examining, for each of a plurality of service providers, a corresponding service graph that includes nodes that represent operations the service provider performs.

The service graphs may be directed graphs, each including a root node and edges connecting nodes to form at least one path from the root node to each of the other nodes of the service graph, each path representing a sequence in which the respective service provider is adapted to perform the operations represented by the service graph. The method may further include: generating an integrated service graph representing a combination of all of the service graphs of the set of service providers; generating a table including fields that each indicates whether a respective one of the set of service providers to which the field corresponds is adapted for performing a respective one of the set of operations to which the field corresponds; based on the integrated service graph and the table, and generating a plurality of service execution plans, each service execution plan including a unique combination of operation-to-service-provider associations, each association associating one of the set of operations with one of the set of service providers. The selecting may include selecting one of the plurality of service execution plans.

The selecting of one of the plurality of service execution plans may include: computing for each of the service execution plans a respective score based on a set of performance quality parameters; and selecting the service execution plan for which a highest one of the scores has been computed.

The computing of the respective score for each of the service execution plans may include: computing, for the service execution plan, a separate sub-score for each of the set of performance quality parameters; and computing the score based on a combination of the sub-scores.

The computing of the score based on the combination of the sub-scores may include: modifying the sub-scores at least based on a comparison of the sub-scores to corresponding sub-scores computed for other ones of the plurality of service execution plans; and adding all of the modified sub-scores.

The score modification may include modifying each of the sub-scores based on a respective weighting value associated with the parameter for which the respective sub-score was computed.

The computing of the score based on the combination of the sub-scores may include computing an equation of $$\left( \sum_{Q_i \in neg} W_i \frac{Q_i^{max} - Q_i}{Q_i^{max} - Q_i^{min}} + \sum_{Q_i \in posg} W_i \frac{Q_i - Q_i^{min}}{Q_i^{max} - Q_i^{min}} \right),$$

where $Q_{i \in neg}$ indicates that the summation function with which $Q_{i \in neg}$ is associated is to be performed for all of the parameters 'i' that are negatively considered, $Q_{i \in pos}$ indicates that the summation function with which $Q_{i \in pos}$ is associated is to be performed for all of the parameters 'i' that are positively considered, $Q_i$ is the sub-score of for a currently considered parameter 'i,' $Q_i^{max}$ is the highest of all of the sub-scores of all of the service execution plans with respect to the currently considered parameter 'i,' $Q_i^{min}$ is the lowest of all of the sub-scores of all of the service execution plans with respect to the currently considered parameter 'i,' and $W_i$ is the weighting value for the currently considered parameter 'i.'

The set of performance quality parameters may include a latency parameter, a reliability parameter, an availability parameter, a fee parameter, and a reputation parameter.

According to yet another example embodiment of the present invention, the computing of the score based on the combination of the sub-scores may include: modifying each of the sub-scores at least based on a respective weighting value associated with the parameter for which the respective sub-score was computed, e.g., with or without further modification based on sub-score comparisons as described above; and adding all of the modified sub-scores.

A set of default weighting values may be used for the modifications, e.g., unless the weighting values are changed by the user.

The selected service execution plan may include more than one of the plurality of service execution plans where the highest score has been computed for each of the more than one service execution plan. The method may further include: providing the user with a list of the execution plans for which the highest score has been computed, from which one of the service execution plans may be selectable by the user. The interfacing with the service provider may be performed in accordance with the user-selected service execution plan.

According to an example embodiment of the present invention, a system for fulfilling a service query for a user may include a processor configured to: parse the query into a set of operations; identify a set of service providers that each provides functionality for performing at least one respective operation of the set of operations; and, for each of the set of operations, select a respective one of the set of service providers to perform the operation, and interface with the service provider selected for the operation to cause the service provider to perform the operation.

To identify the set of service providers, the processor may examine, for each of a plurality of service providers, a corresponding service graph that includes nodes that represent operations the service provider performs.

The service graphs may be directed graphs, each including a root node and edges connecting nodes to form at least one path from the root node to each of the other nodes of the service graph, each path representing a sequence in which the respective service provider is adapted to perform the operations represented by the service graph. The processor is configured to: generate an integrated service graph representing a combination of all of the service graphs of the set of service providers; generate a table including fields that each indicates whether a respective one of the set of service providers to which the field corresponds is adapted for performing a respective one of the set of operations to which the field corresponds; based on the integrated service graph and the table, generate a plurality of service execution plans, each service execution plan including a unique combination of operation-to-service-provider associations, each association associating one of the set of operations with one of the set of service providers; and, for selection of the service providers for the set of operations, select one of the plurality of service execution plans.

To select one of the plurality of service execution plans, the processor may be configured to: compute for each of the service execution plans a respective score based on a set of performance quality parameters; and select the service execution plan for which a highest one of the scores has been computed.

To compute the respective score for each of the service execution plans, the processor may be configured to: compute, for the service execution plan, a separate sub-score for each of the set of performance quality parameters; and compute the score based on a combination of the sub-scores.

To compute the score based on the combination of the sub-scores, the processor may be configured to: modify the sub-scores at least based on a comparison of the sub-scores to corresponding sub-scores computed for other ones of the plurality of service execution plans; and add all of the modified sub-scores.

The modification may be based on a respective weighting value associated with the parameter for which the respective sub-score was computed.

The computation of the score based on the combination of the sub-scores may be performed by a computation of $$\left( \sum_{Q_i \in neg} W_i \frac{Q_i^{max} - Q_i}{Q_i^{max} - Q_i^{min}} + \sum_{Q_i \in pos} W_i \frac{Q_i - Q_i^{min}}{Q_i^{max} - Q_i^{min}} \right),$$

where: $Q_{i \in neg}$ indicates that the summation function with which $Q_{i \in neg}$ is associated is to be performed for all of the parameters 'i' that are negatively considered; $Q_{i \in pos}$ indicates that the summation function with which $Q_{i \in pos}$ is associated is to be performed for all of the parameters 'i' that are positively considered; $Q_i$ is the sub-score of for a currently considered parameter 'i'; $Q_i^{max}$ is the highest of all of the sub-scores of all of the service execution plans with respect to the currently considered parameter 'i'; $Q_i^{min}$ is the lowest of all of the sub-scores of all of the service execution plans with respect to the currently considered parameter 'i'; and $W_i$ is the weighting value for the currently considered parameter 'i'.

The set of performance quality parameters may include a latency parameter, a reliability parameter, an availability parameter, a fee parameter, and a reputation parameter.

According to an example embodiment of the present invention, a computer-readable medium may be provided that has stored thereon instructions executable by a processor, the instructions which, when executed, cause the processor to perform a method for fulfilling a service query for a user. The method may include: parsing the query into a set of operations; identifying a set of service providers that each provides functionality for performing at least one respective operation of the set of operations; and, for each of the set of operations, selecting a respective one of the set of service providers to perform the operation, and interfacing with the service provider selected for the operation to cause the service provider to perform the operation.

DETAILED DESCRIPTION OF EXAMPLE EMBODIMENTS

Figure 1:
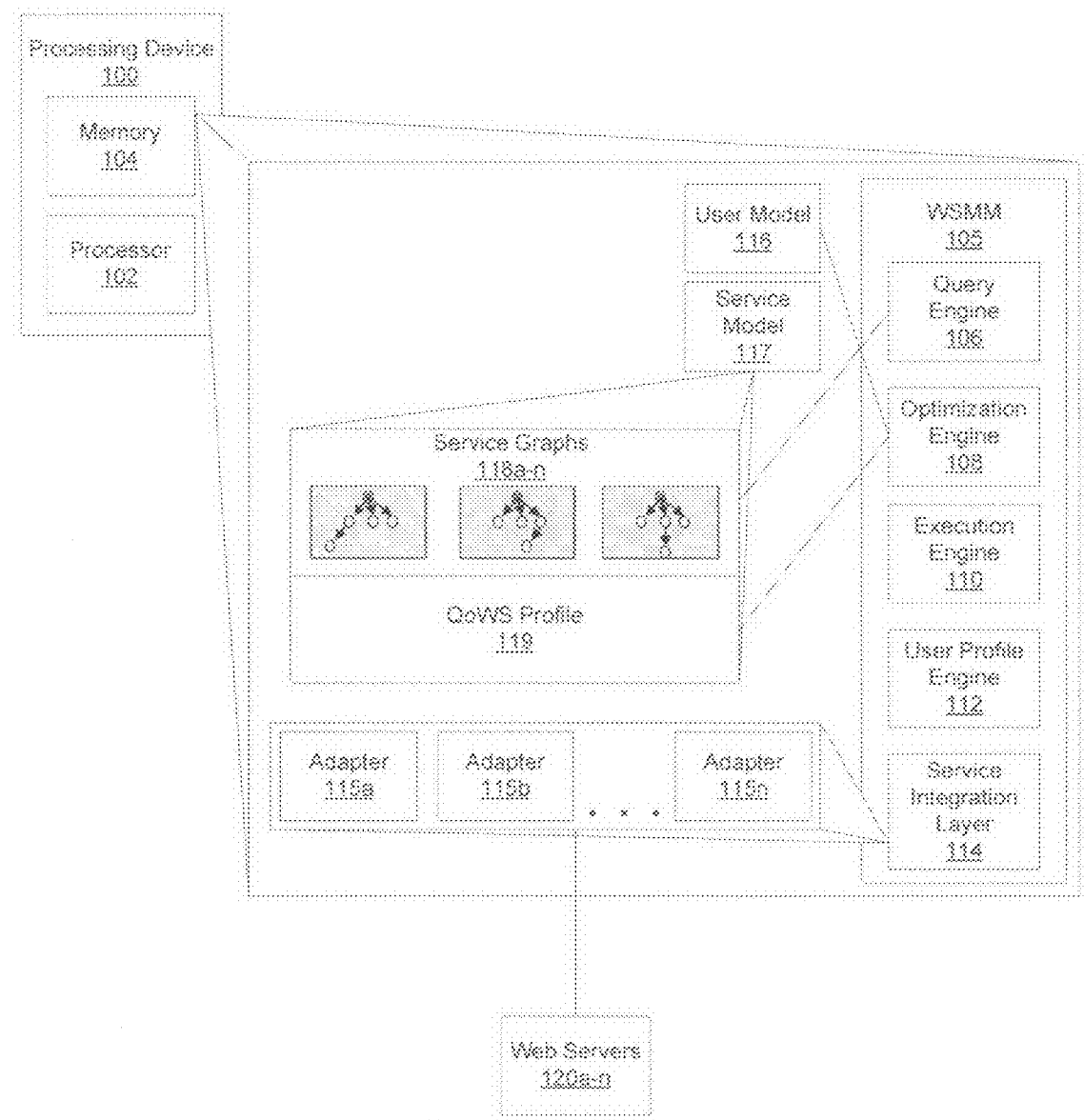
FIG. 1 is a block diagram that illustrated components of a system according to an example embodiment of the present invention.

FIG. 1 illustrates a system according to an example embodiment of the present invention. A processing device 100 may be in communication with a plurality of web servers 120a-n, e.g., via a network such as the Internet. The processing device 100 may include one or more processors 102 and a memory 104. The processor 102 may be any convention computing device and may be embodied, e.g., as a Personal Computer (PC), Application Specific Integrated Computer (ASIC), Personal Digital Assistant (PDA), and/or laptop computer. The memory 104 may include any conventional memory device, e.g., a disk drive, a tape drive, and Compact Disc (CD), a digital versatile disc (DVD), random access memory (RAM), and/or read-only memory (ROM), and/or may include permanent and/or temporary storage.

The memory 104 may store a WSMM 105, which may include sets of instructions executable by the processor 102. For example, the memory 104 may include a hardware-implemented computer-readable medium having stored thereon the sets of instructions which may be processed by the processor 102. The sets of instructions may include a instructions for implementing a query engine 106, an optimization engine 108, an execution engine 110, a user profile manager 112, and a service integration layer 114. The service integration layer 114 may include adapters 115a-n for interfacing with the heterogeneous application interfaces of various web services provided by various web service providers, such as Environmental Systems Research Institute (ESRI), Yahoo, and Google, via the web servers 120a-n.

The memory 104 may further store a user model 116 and a service model 117. The service model 117 may include one or more service graphs 118a-n and a Quality of Web Service (QoWS) profile 119 which may include a plurality of profiles, each of which may include data regarding the quality of a respective one of various web services.

It is noted that not all of the components 106-119 need be stored on the same memory 104 or even the same processing device 100. For example, certain parts of the WSMM 105 may be stored locally and/or executed at a user's processing device while other parts of the WSMM 105 may be stored and/or executed at a remote location that is in communication with the user's processing device.

Furthermore, some of the components stored in the memory 104 may be temporarily stored. For example, the service graphs 118*a-n* and/or WoWS profile 119 may generated for service queries and may be maintained at least until fulfillment of the respective service query.

A user may input a service query into the system. The query engine 106 may parse the query and generate a set of SEPs that each fulfills the user's service query based on the service model 117, e.g., the service graphs 118*a-n*. An SEP is a list of service operations organized based on their dependency relationships, as more fully described below.

The optimization engine 108 may receive as input the SEPs generated by the query engine 106 and select the best one based on the user's preferences as indicated by the service request and/or by the user's profile stored in the user model 116 and/or based on the quality of the web services as indicated by the QoWS profile 119.

The execution engine 110 may receive as input the SEP selected by the optimization engine 108 and execute the selected SEP plan. The invocation may be conducted via the service integration layer 114 which may use the adapters 115*a-n* to interface with the various web services which are to be implemented for the SEP plan. The service integration layer 114 may provide easy-to-use Application Program Interfaces (APIs) for accessing the web services. Therefore, the execution engine 110 can interact with the service integration layer 114 instead of directly with the web service providers. These web service providers may compete with each other by providing similar functionalities and may also be complementary to each other by offering different functionalities. The service integration layer 114 may provide a uniform way to access these services, e.g., by following the OpenGIS standard to define the data types and operation signatures.

The user model 116 may include one more user profiles that describe the basic user information and preferences with respect to service usage. User profiles may be compiled, e.g., by input of preferences via an interface of the user profile manager 112. The basic user information may include a user id, contact information, etc. The service usage preferences may be reflected by a set of weights assigned to different quality parameters of web services, as described in more detail below.

The service model 117 may include information regarding, e.g., functionality, behavior, and quality of web services. The functionality refers to that which the web service does as reflected by the service operations the web service performs, and the behavior refers to how the web service performs its functionality. In particular, the behavior may refer to the dependency relationships between the operations the web service performs. The functionality and behavior of web services may be represented by the service graphs 118*a-n*, each of which may correspond to a respective web service and describe the dependency relationships between the operations of the respective web service. Quality may be captured by the QOWS profile 119.

Figure 2:
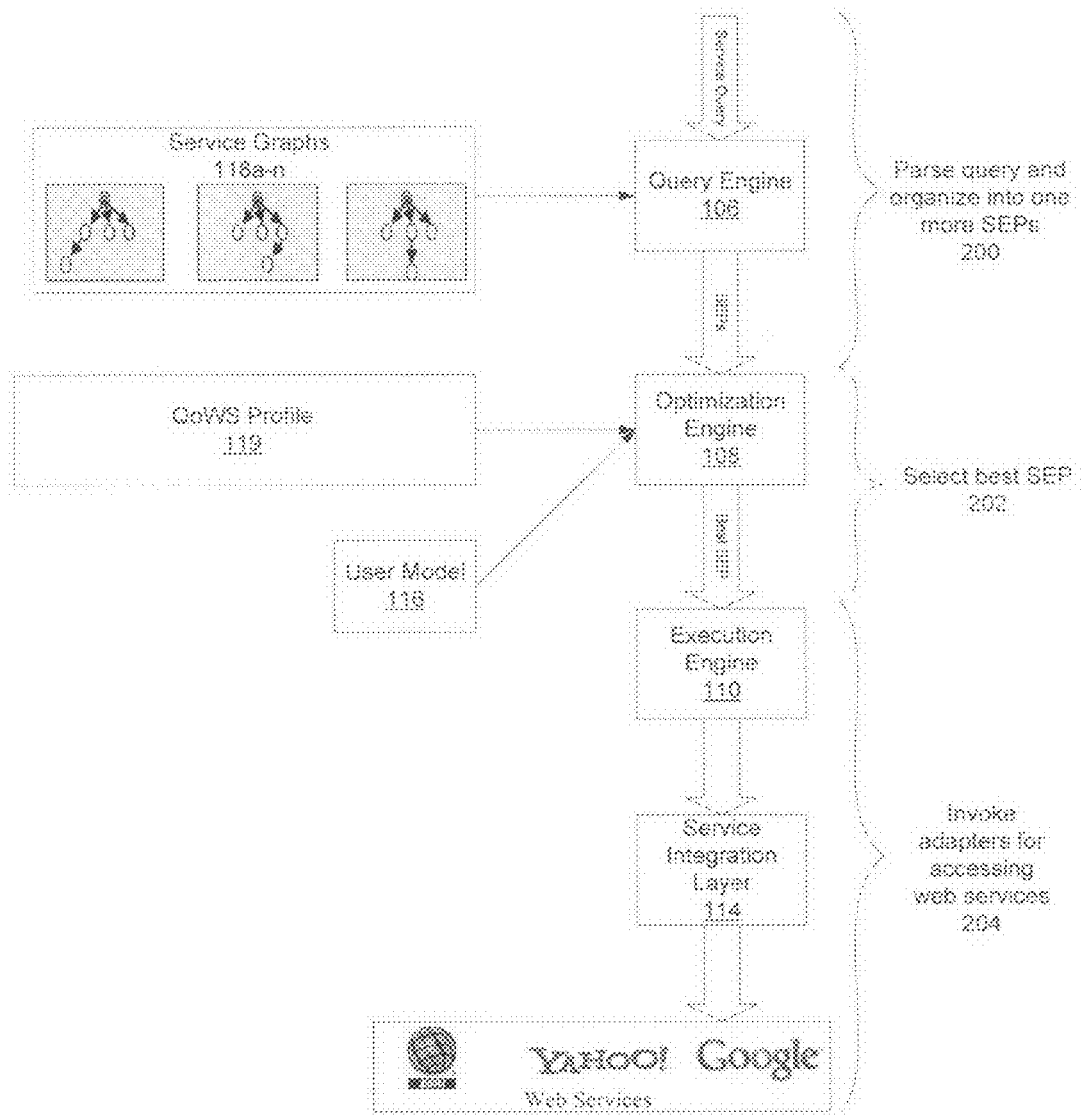
FIG. 2 is a data flow diagram that illustrates a data flow for processing of a service query, according to an example embodiment of the present invention.

FIG. 2 illustrates the data flow for processing a service query according to an example embodiment of the present invention. At step 200 the query engine 106 may parse a received service query into a set of service operations and organize the set of operations into one or more SEPs that each satisfies the input service query. More than one SEP may be generated where one or more of the set of operations may be performed by more than one service provider. For generation of the SEPs, the query engine 106 may obtain one or more service graphs 118 of relevant web service providers to determine the operations and dependency relationships therebetween of the web service providers.

At step 202, the optimization engine 108 may select that which the optimization engine 108 determines if the best choice of the SEPs generated by the query engine 106. The selection may be based on consideration of the non-functional properties of the service providers associated with the generated SEPs in view of the user's preferences as indicated by the user model 116 (all of the SEPs generated by the query engine 106 have already been determined to satisfy the user's functional requirements).

At step 204, the execution engine 110 may invoke the relevant adapters 115 of the service integration layer 114 for accessing the web services implicated by the selected SEP. The execution engine 110 may connect to the relevant web servers 120 and service providers and invoke the web services.

As explained above, the service model 117 may include information regarding, e.g., functionality, behavior, and quality of web services. The service graphs 118*a-n* may provide the information regarding the functionality and behavior. For example, each service graph 118 may represent a respective web service. The service graph 118 may include nodes representing the service operations of the web service and may include edges between the nodes representing the dependency relationships between the operations represented by the nodes. For example, in the ESRI web service, a user must authenticate the user's identity by invoking an authentication operation prior to invoking any other operation of the web service. Therefore, the ESRI service graph 118 may include a node representing the authentication operation with an edge leading therefrom to other nodes representing other operations.

Thus, a service graph 118 may include: V, nodes representing corresponding ones of the set of operations provided by the corresponding web service; R, the root of the service graph; and E, the set of edges between the nodes V and between the node R and nodes V, which represent the dependency relationships between the operations and the root represented by the nodes V and R. Accordingly, $V=\{op_j | 1 \leq j \leq k\}$ and $E=\{e_j | 1 \leq j \leq t\}$, where $e_j=(op, op')$, k=the number of operations of the web service, and t=the number dependencies between the operations. Further, a service graph has only one root R which represents the entry point of the web service. It is assumed that all operations in the service graph can be reached from the root.

In an example embodiment of the present invention, files of the web services, e.g., WSDL files, may be manually examined for manual generation of the service graphs 118*a-n*, e.g., via an interface of a computer program for service graph generation and maintenance. Alternatively, after manual examination, the examined information may be manually stored in a manner that is automatically parseable by the system and method for automatic generation of the service graphs. Alternatively, a universal protocol may be implemented by the web services and the system and method of the present invention may automatically generate service graphs for the web services, e.g., when visiting web services similar to a web crawler or when the information is provided to the system and method by the web services for generation of the service graphs.

Figure 3:
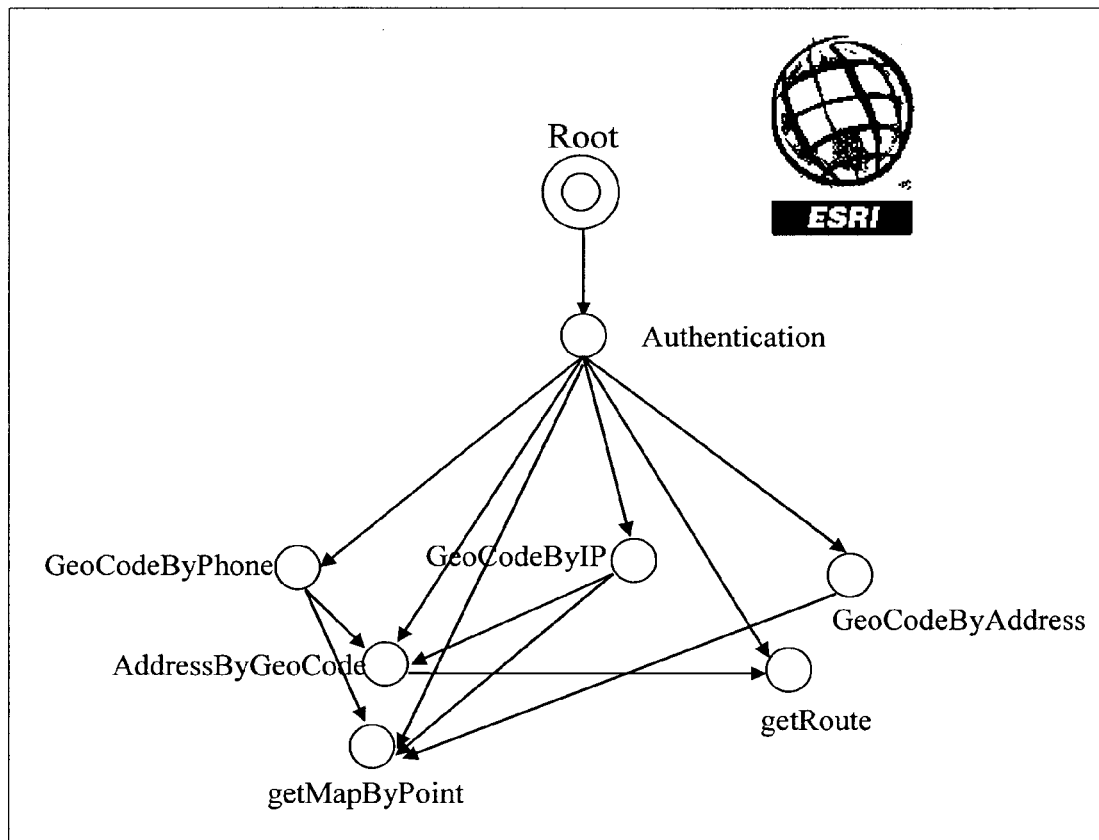
FIG. 3 shows a service graph that may represent a web service, according to an example embodiment of the present invention.

For example, FIG. 3 shows an exemplary service graph 118 that may represent the ESRI web service. The exemplary service graph 118 includes seven vertices which represent the service operations Authentication, GeoCodeByPhone, GeoCodeByIP, GeoCodeByAddress, AddressByGeoCode, getRoute, and getMapByPoint offered by the ESRI web service. The edges between the operations represent their dependency relationships. For example, operations GeoCodeByPhone, GeoCodeByIP, GeoCodeByAddress, AddressByGeoCode, getRoute, and getMapByPoint all depend on a successful Authentication. The getRoute operation also depends on the GeoCodeByPhone and AddressByGeoCode operations if the user wants to find a route and only knows the phone number of the destination address.

Figure 4:
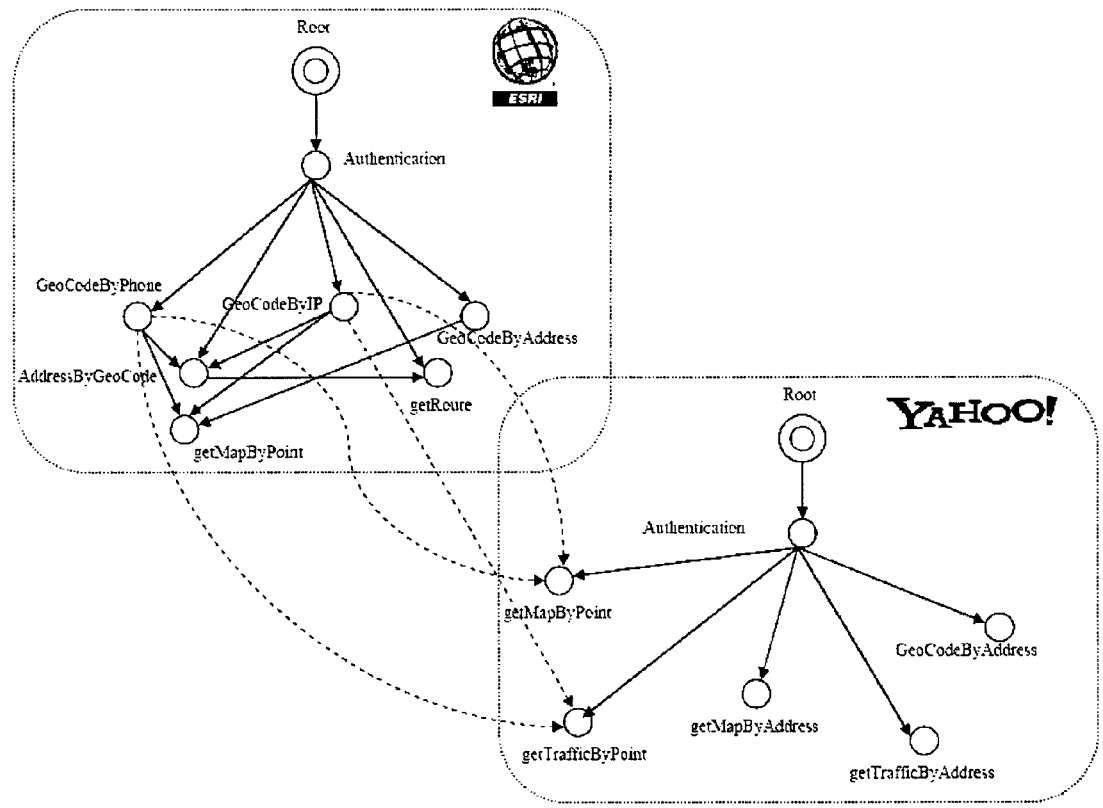
FIG. 4 shows connections between service graphs the represent alternative paths for servicing a service request, according to an example embodiment of the present invention.

FIG. 4 shows an example of two service graphs 118 interconnected to show the dependency relationships between operations of two different web services of two different service providers and which are represented by respective ones of the two service graphs 118 of FIG. 4. A first one of the service graphs 118 represents the web service provided by ESRI and the second service graph 118 represents the web service provided by Yahoo. The dashed lines represent the dependency relationships between operations of different ones of the web services. The consideration of the interplay between the two web services, as represented by the dashed lines, increases the alternative solutions for satisfying a user's service request.

For example, a user may want a map image for a certain address but might only know the phone number of the address. For obtaining the map image, the system and method of the present invention may perform the GeoCodeByPhone and getMapByPoint operations of the ESRI web service. Alternatively, the system and method may perform the GeoCodeByPhone of ESRI web service and the getMapByPoint of the Yahoo service. These two choices may be represented by two SEPs of which the optimization engine 108 may select one based on the quality of the service operations and the user's preferences as explained above and is more fully described below.

The QOWS model 119 may be stored, e.g., in a relational database or using eXtensible Markup Language (XML) documents. The QoWS model 119 may be stored in a fixed manner or may be generated in response to a service query.

The QOWS model 119 may include for each operation a set of values for quality parameters. The parameters may include runtime quality parameters and business quality parameters. The runtime quality parameters represent the measurement of properties that are related to the execution of an operation "op." The runtime quality parameters may include, e.g., latency, reliability, and availability. The latency may measure the expected delay between the moment when op is initiated and the time op sends the results. The reliability of op may be measured as the ability of the operation to be executed within the maximum expected time frame. The availability may be the probability that the operation is accessible. Service providers may publish these runtime qualities of their web service operations in the service description or offer mechanisms to query them.

In an example embodiment of the present invention, the published files of the web services detailing the runtime qualities may be manually examined to obtain this information in order to manually generate the QOWS model 119 or to manually store the information in a form parseable by the system and method for automatic generation of the QoWS model 119. Alternatively, a universal protocol may be implemented for publishing the runtime qualities and the system and method may automatically parse the published runtime qualities, e.g., when visiting web services similar to a web crawler or when the information is provided to the system and method by the web services, in order to generate the QOWS model 119. Alternatively, the system and method may perform the queries of the published qualities using the query mechanisms provided by the web services, e.g., when visiting web services similar to a web crawler or when the system and method is accessed by the web services with a request to perform the query, in order to generate the QOWS model 119.

The business quality parameters may allow for an assessment of an operation op from a business perspective. The business quality parameters may include fee and reputation. The fee may be the dollar amount required to execute op. The reputation may be a measure of the operation's trustworthiness and may depend on the ratio at which the actual provision of the operation is compliant with its promised one. The fee quality can be obtained based on a service provider's advertisement in the service description and the reputation may be based on end-user rankings which may be accessed, e.g., as explained above, either manually or automatically.

Table 1 below shows exemplary definitions of the latency, reliability, availability, fee, and reputation parameters.

TABLE 1

| Category | Parameter | Definition |
| --- | --- | --- |
| Runtime | Latency | $Time_{process(op)} + Time_{results(op)}$, where $Time_{process(op)}$ is the time to process op and $Time_{results(op)}$ is the time to transmit/receive the results |
|  | Reliability | $N_{success(op)}/N_{invoked(op)}$ where $N_{success}$ is the number of times that op has been successfully executed and $N_{invoked}$ is the total number of invocations |
|  | Availability | UpTime(op)/TotalTime(op) where UpTime is the time op is accessible during the total measurement time TotalTime. |
| Business | Fee | Dollar amount to execute the operation |
|  | Reputation | $\sum_{u=1}^{n} Ranking_u(op)/n$, $1 \leq Ranking_u \leq 10$, where $Ranking_u$ is the ranking by user u and n is the number of the times op has been ranked |

In an example embodiment of the present invention, the system and method may be adapted for receiving and interpreting service queries formulated according to a predefined service query syntax. The syntax may require the service query to use path expressions that include service operations and path variables. Service operations may be the operations that the user is desires the system and method to access, such as GeoCodeByPhone, getRoute, etc. However, the user need not specify all of the operations required to perform the user's desired operations. Instead, the user may specify the operations the user desires to be performed and the system and method may determine further operations on which the desired operations depend. Additionally, the user need not specify the order in which to perform operations. Instead, the system and method may determine the order in which to perform the desired operations and the operations on which the desired operations depend. However, should the user be knowledgeable of various dependencies between operations, the user may specify a path using a path variable, which may be represented by a designated symbol such as '/,' and which may represent the precedence relationship between the service operations in the query.

Specifically, the syntax may require the service query to include path expressions that have a Structured Query Language (SQL)-like format, e.g., "SELECT/$op_1$/$op_2$ . . . /$op_k$ FROM $Service_1$, . . . , $Service_n$ WHERE $P_1(op_1)$, $P_2(op_2)$ . . . $P_k(op_k)$," where $op_i$ is a service operation (e.g., GeoCodeByPhone, getRoute), '/' is the path variable representing the precedence relationship between service operations, Service₁, . . . , Serviceₙ are candidate services (e.g., ESRI, Yahoo), and $P_1(op_1), P_2(op_n) \ldots P_k(op_k)$ are predicates on the quality of service operations (e.g., getRoute.fee <$0.5, GeoCodeByPhone.latency <5 s).

The "FROM" portion of the service query may be used to specify the candidate service the user prefers to use. If the user does not have a preference, the user may enter "From *," in which case all the candidate services are automatically considered. For example, the system and method may include a database of web services that perform certain operations. The optimization engine 108 may select the best SEP from all alternative choices.

The "WHERE" portion of the service query may be optional, and may allow the user to specify quality requirements for certain requested operations of the service query, e.g., aside from and/or to trump those already in the user model 116. For example, the user model 116 may be updated to include a temporary user profile including the preferences specified in the service query for use in processing the service query. For example, the user may wish to obtain the route information between two addresses with a cost of less than $0.5 and may therefore specify getRoutefee <$0.5 in the "WHERE" portion of the service query.

Applying the path expression specified in the service query to the service graphs 118, the system and method may obtain a set of paths that each begins from the root, passes service operation $op_1, op_2, \ldots$, and ends with service operation $op_k$.

For example, if a user wants to find a route from the user's home to a restaurant, only knows the phone number of the restaurant, has no preferences with respect to selection of any particular web services, and will not pay more than one dollar for getting the routing information, the user may input the service query "SELECT/GeoCodeByPhone/getRoute FROM * WHERE getRoute.fee <1," where, for example, GeoCodeByPhone is provided for free or as part of a service plan. Otherwise, the user may input, for example, the service query "SELECT/GeoCodeByPhone/getRoute FROM * WHERE (GeoCodeByPhone.fee+getRoutefee) <1."

Figure 5:
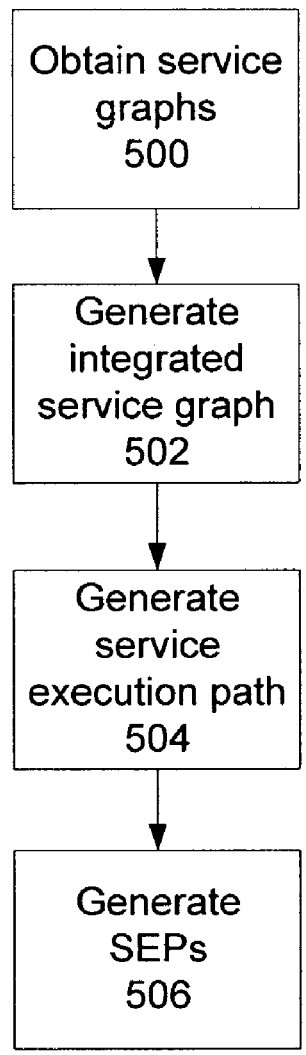
FIG. 5 is a flowchart that illustrates a method that may be performed for servicing a service request, according to an example embodiment of the present invention.

FIG. 5 shows a method that may be performed for servicing a service request according to an example embodiment of the present invention. In response to receipt of a service query, the system and method may, at step 500, obtain the service graphs of the relevant web services. For example, the system and method may determine which service descriptions in its local memory indicates that the corresponding web service provides one or more operations which may be used for processing the service query, and may generate the service graph corresponding to the service based on the description, if the service graph is not already stored in the memory. Alternatively, the service graphs are manually generated and stored in local memory for access by the system and method as described above. Alternatively, the system and method may access sites of service providers, e.g., predetermined providers or ones determined in response to a search via a search engine, to obtain the necessary information, and subsequently generate the service graphs based on the information, as described above. For example, the system and method may examine the WSDL files of the web service, which may describe the types of inputs the web service may take and the types of corresponding output it may provide, to obtain the necessary information.

Figure 6:
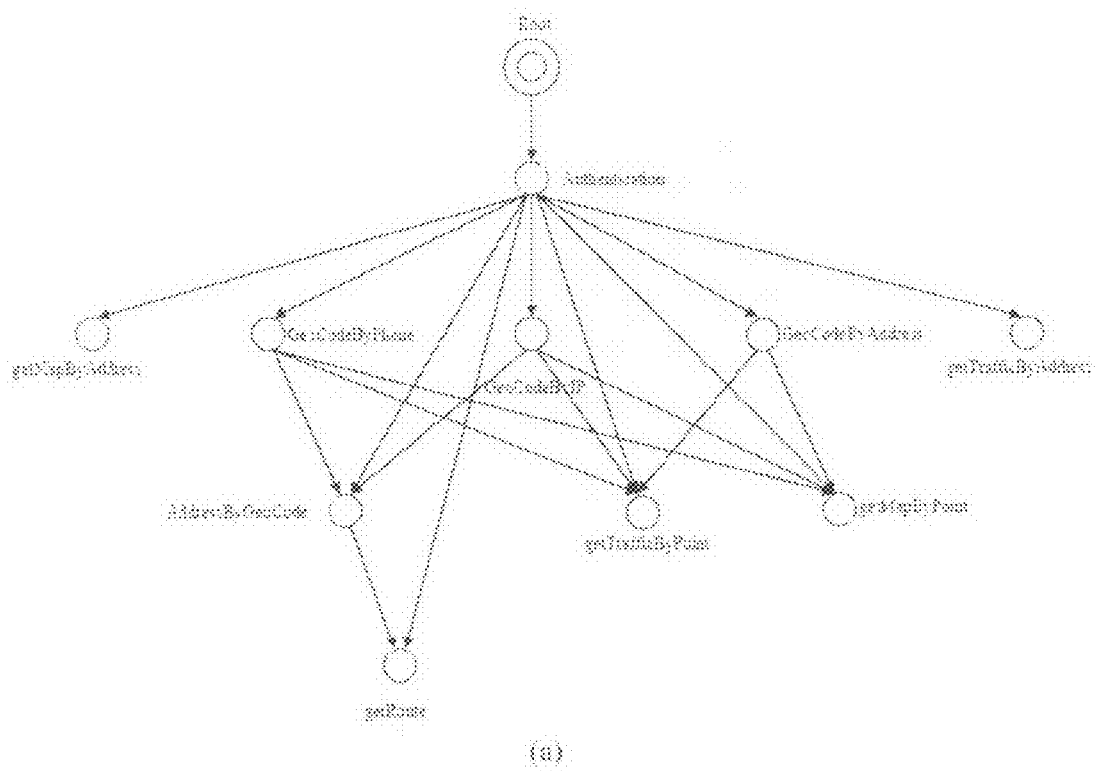
FIG. 6 shows an exemplary integrated service graph, generated based on service graphs representing a number of web services, and a corresponding service relation set, according to an example embodiment of the present invention.

At step 502, the system and method may generate an integrated service graph (or representation thereof) and a service relation set based on the obtained service graphs. FIG. 6a shows an exemplary integrated service graph generated based on the service graphs 118 shown in FIGS. 4 and 6b shows an exemplary corresponding service relation set.

The integrated service graph may represent and include components of a combination of the service graphs 118 of the relevant web services, such as ESRI and Yahoo. The integrated service graph may include an integrated representation of the operations from all of the relevant web services and the dependency relationships between these operations, including the dependencies between operations of different ones of the web services.

The service relation set specifies the operations' memberships in the relevant web services. The "sid" field may be the primary key used to identify the relevant web services (e.g., ESRI and Yahoo). Each of the operation fields may be populated with a value of 1 or 0, where 1 means the corresponding web service offers the operation and 0 means the corresponding web service does not offer the operation.

Referring again to FIG. 5, at step 504, the system and method may generate a service execution path based on the integrated service graph. The service execution path may arrange into a sequence the operations specified in the service query and the necessary parent operations as indicated by the integrated service graph.

In an example embodiment of the present invention, for generating the service execution path, the system and method may take as input the integrated service graph and the list of operations specified by the path expression of the service query and may return a sequence of operations ordered based on their dependency relationships. The generated service execution path may be one determined to be a shortest possible path for execution of all of the specified operations. Any algorithm for determining a shortest route may be used. For example, the system and method may use Dijkstra's shortest path algorithm to determine shortest routes.

Figure 7:
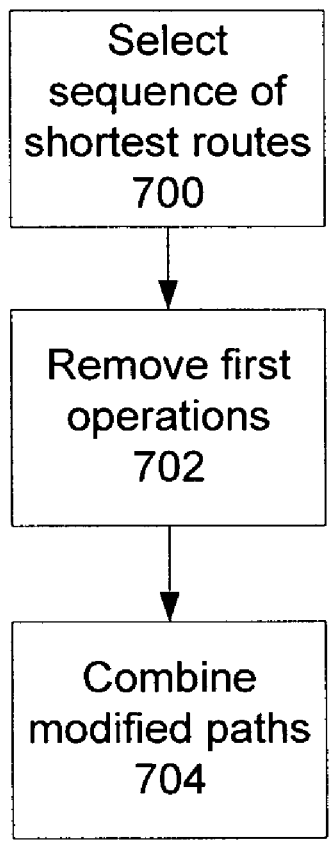
FIG. 7 is a flowchart that illustrates a method that may be performed for generating a service execution path, according to an example embodiment of the present invention.

FIG. 7 shows a method that may be performed for generating the service execution path. At step 700, the system and method may, using a shortest route determining algorithm, select in the integrated service graph, a sequence of shortest routes between the root and the first operation specified in the service query and between each of the operations specified in the service query, each route being a partial path. After all of the partial paths are determined, the system and method may, at 702, remove from each of the partial paths, but for the initial path extending from the root, the first operation of the path. At 704, the system and method may combine the modified partial paths according to the sequence of operations specified by the service query to obtain the service execution path.

For example, for a service query which specifies "/GeoCodeByPhone/getRoute," the system and method may search the integrated service graph for the shortest path from the root to the GeoCodeByPhone operation to obtain the partial path of "Root, Authentication, GeoCodeByPhone." The system and method may then search the integrated service graph for the shortest path from the GeoCodeByPhone operation to the getRoute operation to obtain the partial path of "GeoCodeByPhone, AddressByGeoCode, getRoute." GeoCodeByPhone may be removed from the second path to avoid redundancy. The two paths may then be connected to generate the service execution path of "Root, Authentication, GeoCodeByPhone, AddressByGeoCode, getRoute."

Referring again to FIG. 5, at step 506, the system and method may generate, based on the service relation set, one or more SEPs that conform to the service execution path. SEPs are instantiations of the service execution path, modified to additionally identify the web service providers (e.g., ESRI or Yahoo) to be used for each of the operations. Each different SEP may be associated with a different service provider. Further, different operations of a single SEP may be associated with different service providers. If there are M service operations in the generated service execution path and there are N service providers, the maximum number of SEPs which may be generated is $N^M$, assuming that each of the N service providers can perform each of the M operations.

For generation of the SEPs, the system and method may query the service relation set to determine, for each of the operations of the service execution path other than Root and Authentication which do not provide any functionality, which of the service providers provide the operation. For each of the service providers determined to provide the operation, a corresponding copy of the set of SEPs may be generated including a node for the previously determined operation associated with the service provider that provides the operation.

Figure 8:
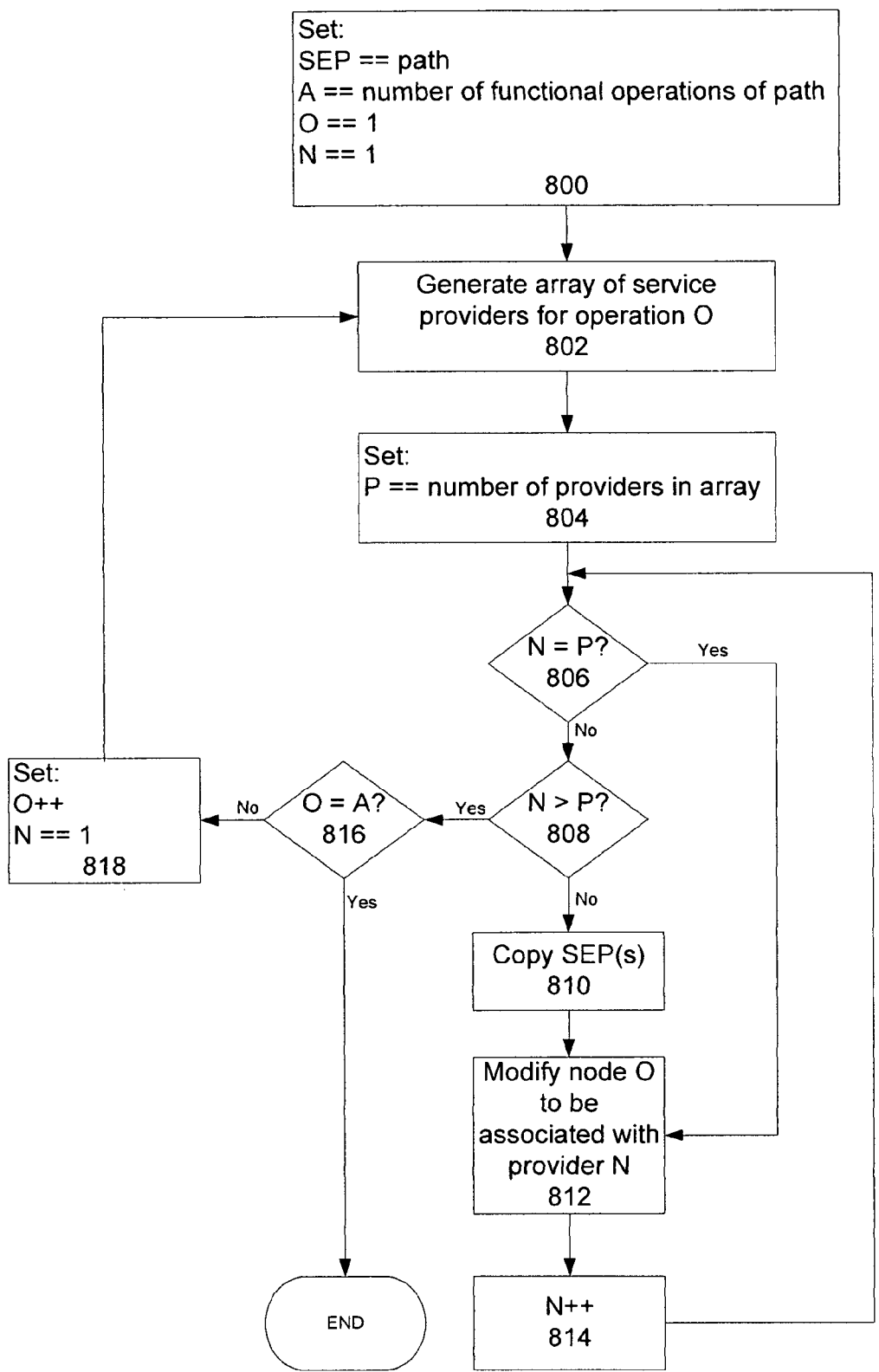
FIG. 8 is a flowchart that illustrates a method that may be performed for generating a set of Service Execution Plans (SEPs), according to an example embodiment of the present invention.

FIG. 8 shows a method for generating the sets of SEPs, according to an example embodiment of the present invention. At step 800, the system and method may initialize by setting the generated service execution path as an initial SEP, a variable 'A' to the number of functional operations of the service execution path, a variable 'O' to 1, and a variable 'N' to 1.

At step 802, the system and method may generate an array including identifications of all of the service providers that provide functional operation O, determined by referencing the service relation set generated at step 502 of FIG. 5. (At the first pass, O is the first functional operation, since O had been set to 1.)

At step 804, the system and method may set a variable 'P' to the number of positions of the generated array, so that the value of P equals the number of service providers that provide operation O.

At step 806, the system and method may determine whether N=P. If N=P, then the system and method may proceed to step 812. Otherwise, the system and method may, at step 808, determine whether N>P. If N<P, then the system and method may proceed to step 810.

At step 810, the system and method may generate a copy of each of the SEPs that include O-1 functional operations associated with service providers. (At the first pass, there is only one SEP, i.e., the initially generated service execution path which includes 0 operations associated with a service provider.)

At step 812, the system and method may modify a node representing operation O to be associated with service provider N for each of a set of SEPs, the set including all SEPs having O-1 functional operations associated with a service provider but not including duplicates.

At step 814, the system and method may increment N by 1 and proceed again to step 806.

If it is determined at step 808 that N>P, the system and method may, at step 816, determine whether O=A. If O≠A, the system and method may, at step 820, increment O by 1 and reset N to 1. The system and method may then return to step 802 If O=A, the method may end since for each functional operation, there is, for each service provider that provides the operation, a node that corresponds to the operation and the service provider.

The set of steps and/or the sequence of the set of steps of FIG. 8 is but one of many possible sets of steps and/or sequence of the set of steps for generating the SEPs.

Applying step 506 of FIG. 5, e.g., using the steps of FIG. 8, to a generated service execution path of "Root, Authentication, GeoCodeByPhone, AddressByGeoCode, getRoute," the system and method may selectively consider three operations, i.e., GeoCodeByPhone, AddressByGeoCode, and getRoute for generating the SEPs, to the exclusion of Root and Authentication because Root and Authentication do not provide functionalities. If two service providers, e.g., ESRI and Yahoo are considered, the maximum number of SEPs that may be generated is 23. However, querying the service relation set as shown in FIG. 6b, the system and method would determine that Yahoo does not provide any of the three considered operations. Therefore, the system and method would generate only one SEP of "Root, Authentication, ESRI.GeoCodeByPhone, ESRI.AddressByGeoCode, ESRI.getRoute."

Applying step 506 of FIG. 5, e.g., using the steps of FIG. 8, to a generated service execution path of "Root, Authentication, GeoCodeByPhone, GetMapByPoint," querying the service relation set as shown in FIG. 6b, the system and method would generate two different service execution plans of "Root, Authentication, ESRI.GeoCodeByPhone, ESRI.GetMapByPoint" and "Root, Authentication, ESRI.GeoCodeByPhone, Yahoo.GetMapByPoint." In this case, the optimization engine 108 would, in step 202 of FIG. 2, select one of the two generated SEPs based on the QoWS 119 as applied to each SEP as a whole and on the user preferences as indicated by the user model 116.

Operations of a set of SEPs that are all generated based on a same service execution path are arranged in the same manner in each of the SEPs of the set and differ from each other only by the operation/provider associations and the corresponding resulting quality of service as measured by the non-functional properties.

In step 202 of FIG. 2, the optimization engine 108 may select one of the SEPs based on these quality of service differences. The selection may be in accordance with an exhaustive approach. Alternatively, it may be in accordance with a greedy approach. According to the exhaustive approach, parameter scores may be computed on an SEP by SEP basis, and then one of the SEPs may be selected using function F described below. According to the greedy approach parameter scores may be computed on an operation by operation basis. Then, for each of the operations, one of the operation/service provider combinations may be selected using function F described below. After all of the operation/service provider combinations are selected, they may be arranged together in an order that accords with the service execution path to obtain the selected SEP.

Figure 9:
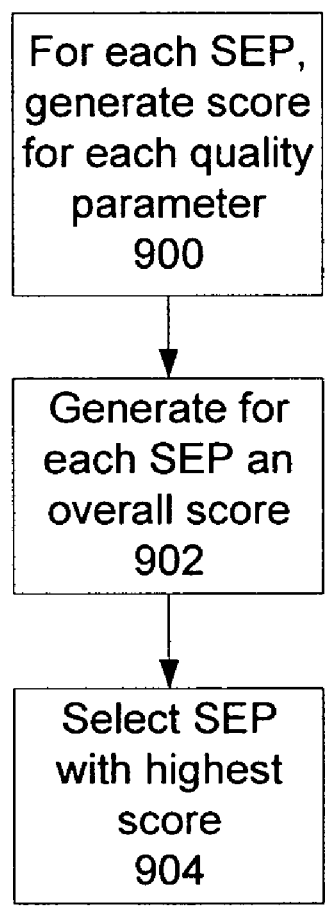
FIG. 9 is a flowchart that illustrates a method for selecting an SEP, according to an example embodiment of the present invention.

FIG. 9 shows a method for selecting an SEP in accordance with the exhaustive approach, according to an example embodiment of the present invention. However, the greedy approach may be implemented in an analogous manner, but for the differences explained above. At step 900, the system and method may, for each SEP, generate a score for each of a predetermined set of quality parameters. For example, the set of quality parameters may include latency, reliability, availability, fee, and reputation as explained above with respect to Table 1. For each parameter, the score may be computed as a combination of quality values, corresponding to the parameter, of each of the operations of the SEP. To compute the SEP quality scores, it may be assumed that each operation's quality value has no impact on any other of the operations' quality values.

Accordingly, where 'n' is the number of functional operations of an SEP, the SEP's latency may be computed as the sum of latencies of all of the operations that would be executed in sequence along the SEP, i.e., $$\sum_{j=1}^{n} \text{latency}(op_j);$$

the SEP's reliability may be computed as the iterative product of the reliability of each of the operations of the SEP, i.e., $$\prod_{j=1}^{n} \text{rel}(op_j),$$

which is the probability that all of the operations of the SEP as a whole are reliable; the SEP's availability may be computed as the iterative product of the availability of each of the operations of the SEP, i.e., $$\prod_{j=1}^{n} av(op_j),$$

which is the probability that all of the operations of the SEP as a whole are available; the SEP's fee may be computed as the sum of all of the operations' fees, i.e., $$\sum_{j=1}^{n} \text{fee}(op_j);$$

and the SEP's reputation may be computed as the average of the reputation values of the operations of the SEP, i.e., $$\frac{\sum_{j=1}^{n} \text{rep}(op_j)}{n}.$$

Table 2 provides an overview of these aggregation functions.

TABLE 2

| QoWS Parameters | Aggregation Function |
| --- | --- |
| Latency | $\sum_{j=1}^{n} \text{latency}(op_j)$ |
| Reliability | $\prod_{j=1}^{n} \text{rel}(op_j)$ |
| Availability | $\prod_{j=1}^{n} av(op_j)$ |
| Fee | $\sum_{j=1}^{n} \text{fee}(op_j)$ |
| Reputation | $\frac{\sum_{j=1}^{n} \text{rep}(op_j)}{n}$ |

After the quality scores are computed, the system and method may, at step 902, compute an overall score for each of the SEPs and may, at step 904, select the SEP with the, e.g., highest score. Different users may place higher importance to some of the considered parameters over other of the considered parameters. Accordingly, in an example embodiment of the present invention, the user may specify, e.g., using an interface of the user profile engine 112, which parameters to consider and/or, for the considered parameters a respective weighting value 'W,' e.g., between 0 to 1. When computing the SEP score, the system and method may selectively consider those parameters the user has selected for consideration or, alternatively, those parameters the user has not selected to not be considered, to the exclusion of all other parameters. Further, the system and method may weight the quality scores based on any input weighting value W.

In an example embodiment of the present invention, instead of computing an absolute score for each SEP, the scores of all of the SEPs may be computed relative to each other. For example, for each SEP, a score function F may be applied to calculate its score, where $$F = \left( \sum_{Q_i \in neg} W_i \frac{Q_i^{max} - Q_i}{Q_i^{max} - Q_i^{min}} + \sum_{Q_i \in posg} W_i \frac{Q_i - Q_i^{min}}{Q_i^{max} - Q_i^{min}} \right),$$

$Q_i$ is the currently considered SEP's quality score for the currently considered parameter, $W_i$ is the weight for the currently considered parameter, $Q_i^{max}$ is the highest quality score of all of the SEPs for the currently considered parameter, $Q_i^{min}$ is the lowest quality score of all of the SEPs for the currently considered parameter, $Q_{i \in neg}$ means for all scores that are for parameters which are considered negatively (e.g., latency and fee), and $Q_{i \in pos}$ means for all scores that are for parameters that are positively considered (e.g., reliability, availability, and reputation). According to this function, for each parameter, an SEP will receive the highest of all of the SEPs' scores either if it is the highest score for a positively considered parameter or if it is the lowest score for a negatively considered parameter, and the SEP will receive the lowest of all of the SEPs' scores either if it is the lowest score for a positively considered parameter or if it is the highest score for a negatively considered parameter.

With respect to negatively considered parameters, the higher the value, the worse the quality. In contrast, with respect to positively considered parameters, the lower the value, the worse the quality. For this reason, the positively and negatively considered parameters may be considered separately and differently.

After the SEP is selected, the execution engine 110 may implement the selected SEP, as discussed above.

It may occur that the highest score is computed for two or more of the SEPs. In an example embodiment of the present invention, the system and method may provide to the user a list of the two or more SEPs for which the highest score has been computed, for selection by the user of one of the listed SEPs. The system and method may implement the SEP selected by the user. In a variant of this example embodiment, the system and method may also present to the user the individual quality scores, by parameter, for each of the listed SEPs so that the user may make the selection using this information. In yet another variant of this example embodiment, the system and method may additionally or alternatively provide a further breakdown of the scores by operation.

In yet another variant of this example embodiment, the system and method may provide the user with an option of indicating that the user does not have any preference.

If the user selects this option, the system and method may, e.g., randomly, select one of the SEPs. In an alternative example variant of this embodiment, if the user selects this option, the system and method may compare the individual parameter scores of the two or more SEPs, beginning at a first of the parameters and continuing on to a last of the parameters, where the parameters are ordered from that to which the highest weighting factor has been assigned to that to which the lowest weighting factor has been assigned. As soon as a subset of the two or more SEPs is determined to have been assigned a higher score than others of the two or more SEPs, the subset may be selected. This may be continued until only one SEP remains. It will be appreciated that other variations of this selection method may be implemented. Where there is no difference between two or more of the SEPs with respect to assigned scores, the system and method may, e.g., randomly, select one of the SEPs.

In an alternative example embodiment of the present invention, where the highest score is computed for two or more of the SEPs, the system may select one of the SEPs without providing a list to the user, e.g., randomly or by some selection method as described above.

Those skilled in the art can appreciate from the foregoing description that the present invention may be implemented in a variety of forms. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A computer-implemented method for fulfilling a service query for a user, comprising:
   parsing, by a computer processor, the query into a set of operations;
   identifying, by the processor, a set of service providers that each provides functionality for performing at least one respective operation of the set of operations, wherein the identifying includes examining, for each of a plurality of service providers a corresponding service graph that includes nodes that represent operations provider performs;
   for each of the set of operations:
      selecting, by the processor, a respective one of the set of service providers to perform the operation; and
      interfacing, by the processor, with the service provider selected for the operation to cause the service provider to perform the operation;
   generating, by the processor, an integrated service graph representing a combination of all of the service graphs of the set of service providers;
   generating, by the processor, a table including fields that each indicates whether a respective one of the set of service providers to which the field corresponds is adapted for performing a respective one of the set of operations to which the field corresponds; and
   based on the integrated service graph and the table, generating, by the processor, a plurality of service execution plans, each service execution plan including a unique combination of operation-to-service-provider associations, each association associating one of the set of operations with one of the set of service providers;

wherein:
   the service graphs are directed graphs, each including a root node and edges connecting nodes to form at least one path from the root node to each of the other nodes of the service graph, each path representing a sequence in which the respective service provider is adapted to perform the operations represented by the service graph; and
   the selecting includes selecting one of the plurality of service execution plans.

2. The method of claim 1, wherein the selecting the one of the plurality of service execution plans includes:
   computing for each of the service execution plans a respective score based on a set of performance quality parameters; and
   selecting the service execution plan for which a highest one of the scores has been computed.

3. The method of claim 2, wherein the computing the respective score for each of the service execution plans includes:
   computing, for the service execution plan, a separate sub-score for each of the set of performance quality parameters; and
   computing the score based on a combination of the sub-scores.

4. The method of claim 3, wherein the computing the score based on the combination of the sub-scores includes:
   modifying the sub-scores at least based on a comparison of the sub-scores to corresponding sub-scores computed for other ones of the plurality of service execution plans; and
   adding all of the modified sub-scores.

5. The method of claim 4, wherein the modifying includes modifying each of the sub-scores based on a respective weighting value associated with the parameter for which the respective sub-score was computed.

6. The method of claim 5, wherein:
   the computing the score based on the combination of the sub-scores includes computing an equation of $$\left( \sum_{Q_i \in neg} W_i \frac{Q_i^{max} - Q_i}{Q_i^{max} - Q_i^{min}} + \sum_{Q_i \in posg} W_i \frac{Q_i - Q_i^{min}}{Q_i^{max} - Q_i^{min}} \right);$$

$Q_{i \in neg}$ indicates that the summation function with which $Q_{i \in neg}$ is associated is to be performed for all of the parameters 'i' that are negatively considered;
$Q_{i \in pos}$ indicates that the summation function with which $Q_{i \in pos}$ is associated is to be performed for all of the parameters 'i' that are positively considered;
$Q_i$ is the sub-score of for a currently considered parameter 'i';
$Q_i^{max}$ is the highest of all of the sub-scores of all of the service execution plans with respect to the currently considered parameter 'i';
$Q_i^{min}$ is the lowest of all of the sub-scores of all of the service execution plans with respect to the currently considered parameter 'i'; and
$W_i$ is the weighting value for the currently considered parameter 'i'.

7. The method of claim 3, wherein the set of performance quality parameters includes a latency parameter, a reliability parameter, an availability parameter, a fee parameter, and a reputation parameter.

8. The method of claim 3, wherein the computing the score based on the combination of the sub-scores includes:

modifying each of the sub-scores at least based on a respective weighting value associated with the parameter for which the respective sub-score was computed; and adding all of the modified sub-scores.

9. The method of claim 8, wherein a set of default weighting values are used for the modifications unless the weighting values are changed by the user.

10. The method of claim 2, wherein the selected service execution plan includes more than one of the plurality of service execution plans where the highest score has been computed for each of the more than one service execution plan, the method further comprising:

providing the user with a list of the more than one execution plan from which one of the more than one service execution plan is selectable by the user, wherein the interfacing is performed in accordance with the selected one of the more than one service execution plan.

11. A system for fulfilling a service query for a user comprising:

a processor configured to:

parse the query into a set of operations;

identify a set of service providers that each provides functionality for performing at least one respective operation of the set of operations, wherein to identify the set of service providers, the processor is configured to examine, for each of a plurality of service providers, a corresponding service graph that includes nodes that represent, operations the service provider performs;

for each of the set of operations:

select a respective one of the set of service providers to perform the operation; and interface with the service provider selected for the operation to cause the service provider to perform the operation;

generate an integrated service graph representing a combination of all of the service graphs of the set of service providers;

generate a table including fields that each indicates whether a respective one of the set of service providers to which the field corresponds is adapted for performing a respective one of the set of operations to which the field corresponds; and based on the integrated service graph and the table, generate a plurality of service execution plans, each service execution plan including a unique combination of operation-to-service-provider associations, each association associating one of the set of operations with one of the set of service providers;

wherein:

the service graphs are directed graphs, each including a root node and edges connecting nodes to form at least one path from the root node to each of the other nodes of the service graph, each path representing a sequence in which the respective service provider is adapted to perform the operations represented by the service graph; and to select the service providers for the set of operations, the processor is configured to select one of the plurality of service execution plans.

12. The system of claim 11, wherein to select the one of the plurality of service execution plans, the processor is configured to:

compute for each of the service execution plans a respective score based on a set of performance quality parameters; and select the service execution plan for which a highest one of the scores has been computed.

13. The system of claim 12, wherein to compute the respective score for each of the service execution plans, the processor is configured to:

compute, for the service execution plan, a separate sub-score for each of the set of performance quality parameters; and compute the score based on a combination of the sub-scores.

14. The system of claim 13, wherein to compute the score based on the combination of the sub-scores, the processor is configured to:

modify the sub-scores at least based on a comparison of the sub-scores to corresponding sub-scores computed for other ones of the plurality of service execution plans; and add all of the modified sub-scores.

15. The system of claim 14, wherein the modification is based on a respective weighting value associated with the parameter for which the respective sub-score was computed.

16. The system of claim 15, wherein:

the computation of the score based on the combination of the sub-scores is performed by a computation of $$\left( \sum_{Q_i \in neg} W_i \frac{Q_i^{max} - Q_i}{Q_i^{max} - Q_i^{min}} + \sum_{Q_i \in pos} W_i \frac{Q_i - Q_i^{min}}{Q_i^{max} - Q_i^{min}} \right);$$

$Q_{i \in neg}$ indicates that the summation function with which $Q_{i \in neg}$ is associated is to be performed for all of the parameters 'i' that are negatively considered;

$Q_{i \in pos}$ indicates that the summation function with which $Q_{i \in pos}$ is associated is to be performed for all the parameters 'i' that are positively considered;

$Q_i$ is the sub-score of for a currently considered parameter 'i';

$Q_i^{max}$ is the highest of all of the sub-scores of all of the service execution plans with respect to the currently considered parameter 'i';

$Q_i^{min}$ is the lowest of all of the sub-scores of all of the service execution plans with respect to the currently considered parameter 'i'; and $W_i$ is the weighting value for the currently considered parameter 'i'.

17. The system of claim 13, wherein the set of performance quality parameters includes a latency parameter, a reliability parameter, an availability parameter, a fee parameter, and a reputation parameter.

18. A computer-readable medium having stored thereon instructions executable by a processor, the instructions which, when executed, cause the processor to perform a method for fulfilling a service query for a user, the method comprising:

parsing the query into a set of operations;

identifying a set of service providers that each provides functionality for performing at least one respective operation of the set of operations, wherein the identifying includes examining, for each of a plurality of service providers, a corresponding service graph that includes nodes that represent operations the service provider performs;

for each of the set of operations:
   selecting a respective one of the set of service providers to perform the operation; and
   interfacing with the service provider selected for the operation to cause the service provider to perform the operation;

generating an integrated service graph representing a combination of all of the service graphs of the set of service providers;

generating a table including fields that each indicates whether a respective one of the set of service providers to which the field corresponds is adapted for performing a respective one of the set of operations to which the field corresponds; and based on the integrated service graph and the table, generating a plurality of service execution plans, each service execution plan including a unique combination of operation-to-service-provider associations, each association associating one of the set of operations with one of the set of service providers;

wherein:
   the service graphs are directed graphs, each including a root node and edges connecting nodes to form at least one path from the root node to each of the other nodes of the service graph, each path representing a sequence in which the respective service provider is adapted to perform the operations represented by the service graph; and
   the selecting includes selecting one of the plurality of service execution plans.

\* \* \* \* \*